US011510370B2

(12) United States Patent
Lervik et al.

(10) Patent No.: US 11,510,370 B2
(45) Date of Patent: Nov. 29, 2022

(54) METHOD AND DEVICE FOR WRAPPING AND TAGGING OF ROUND BALES

(71) Applicant: Orkel Development AS, Fannrem (NO)

(72) Inventors: Magnus Nordaas Lervik, Trondheim (NO); Halvor Skraastad, Orkanger (NO)

(73) Assignee: Orkel Development AS, Fannrem (NO)

( * ) Notice: Subject to any disclaimer, the term of this patent is extended or adjusted under 35 U.S.C. 154(b) by 168 days.

(21) Appl. No.: 16/762,226

(22) PCT Filed: Nov. 12, 2018

(86) PCT No.: PCT/NO2018/050271
§ 371 (c)(1),
(2) Date: May 7, 2020

(87) PCT Pub. No.: WO2019/093905
PCT Pub. Date: May 16, 2019

(65) Prior Publication Data
US 2020/0344955 A1 Nov. 5, 2020

(30) Foreign Application Priority Data
Nov. 10, 2017 (NO) .................................. 20171787

(51) Int. Cl.
*A01F 15/07* (2006.01)
*A01F 15/08* (2006.01)

(52) U.S. Cl.
CPC ........ *A01F 15/071* (2013.01); *A01F 15/0825* (2013.01); *A01F 2015/076* (2013.01)

(58) Field of Classification Search
CPC ....... B65B 61/02; B65B 11/04; B65B 11/045; A01F 15/071; A01F 15/0715; A01F 15/08; A01F 15/0825; A01F 2015/076
(Continued)

(56) References Cited

U.S. PATENT DOCUMENTS

| 5,024,718 A | * | 6/1991 | Hannen ..................... B65C 1/02 156/570 |
| 2002/0124529 A1 | * | 9/2002 | van der Lely .......... B65B 11/04 53/411 |

(Continued)

OTHER PUBLICATIONS

International Search Report and Written Opinion dated Jan. 7, 2019 (PCT/NO2018/050271).
(Continued)

Primary Examiner — Andrew M Tecco
Assistant Examiner — Jacob A Smith
(74) Attorney, Agent, or Firm — Alix, Yale & Ristas, LLP

(57) ABSTRACT

Method and device for tagging round bales during wrapping in plastic foil, using a stationary or mobile baler-wrapper. Each round bale is oriented with the circular end surfaces mainly vertically and layers of plastic foil is wrapped around the round bale by foil wrapping arms. At a point in time where at least one layer of plastic film remains to be wrapped, each round bale is tagged with an ID tag having an adhesive back-side surface, using a time controlled, pivotal tagging arm provided with a tag transferring member. The movement of said tagging arm is controlled by a computer, which synchronizes the movement of the tagging arm with the movement of the foil supplying arms. After tagging, at least one additional layer of plastic is wrapped around each round bale to protect the ID tag.

20 Claims, 3 Drawing Sheets

(58) Field of Classification Search
USPC .................................. 53/411, 465, 587, 588
See application file for complete search history.

(56) References Cited

U.S. PATENT DOCUMENTS

| | | | |
|---|---|---|---|
| 2012/0048129 A1* | 3/2012 | Smith ..................... | A01F 15/08 |
| | | | 235/375 |
| 2014/0290202 A1* | 10/2014 | Wigdahl .............. | A01D 46/084 |
| | | | 53/64 |
| 2017/0287303 A1* | 10/2017 | Lang .................. | G08B 21/0275 |

OTHER PUBLICATIONS

International Preliminary Report on Patentability dated Jan. 7, 2020 (PCT/NO2018/050271).

* cited by examiner

METHOD AND DEVICE FOR WRAPPING AND TAGGING OF ROUND BALES

BACKGROUND

The disclosed embodiments relate to wrapping and tagging of round bales of organic material, such as agricultural produce for use as animal forage.

In land-based farming, bales of nutrient containing materials have become widely used in recent years, primarily as a means to store and distribute forage for animals on a farm. The forage is typically based on grass, but can incorporate also other forms of nutrient containing materials valuable for growth of the animals and their ability to produce milk, etc. Other nutrient containing materials, which are used in round bales today, includes but is not limited to; maize, whole crop rice, forage mixes such as TMR (total mixed ration), crimped grain, etc.

Round bales, i.e. bales with a cylindrical shape and circular end surfaces, are commonly used for the storage and logistics of this type of organic product, but may be used also in other industries, for example; aqua-cultural products such as seaweed to be used as medicine or food, food byproducts such as fruit or beet pulp to be used as animal feed, manure from cattle or chicken to be used as fertilizer, etc.

While the size of the bales is a factor that can be visually controlled quite easily, the actual contents and derived value of each bale may vary significantly in dependence upon the material or mix of materials used, including but not limited to composition, weight, water content, etc. In many cases there will also be legal requirements for tracking and documenting the origin and production process of the materials. Some examples include but is not limited to; risk of the material having been exposed to animal or human disease, toxicity level as documented by a presence of fungi, mycotoxins or similar, as well as radiation level.

Knowing as much as possible about the quality, quantity and composition of a material is highly desirable. For example, by knowing the chemical composition and energy content of the material that is fed to the livestock, the farmer will be able to give correctly adjusted rations of food with the precise amount of supplements to his or her animals, greatly reducing some of the main economic and environmental challenges on the farm today, namely over- and underfeeding, food-induced health risks, malnutrition, use of antibiotics and veterinary costs. While the farmer or other such user typically knows by experience what forage to use and in what quantities, there is no doubt that experience alone is not sufficient for adequately determining the correct ration or mix. This is especially true when considering materials where the composition is more complex, such as for TMR or other forages mixes. Any material that is organic will by definition be subject to natural changes in its composition, and further variations will be imposed by weather, temperatures, fertilization, crop type and location, time of harvest, etc.

Systems have been proposed and introduced in order to assist the farmer in this respect, with the goal of obtaining a better overview of the situation. Preferably, such systems should make readily available to the user as much information as possible pertaining to the material, its contents and composition, the process by which it was manufactured, etc., and furthermore such information should be available on a bale-by-bale basis.

General information related to constituent determination of crops in round balers are provided in Landteknik 3, 2011, p 180-182, by Walther velt et al. The publication focuses a.o. on the need for accurate determination of the constituents. Moisture measurements using NIR technology was used to assess moisture content and contents of other ingredients.

In DOE Bioenergy Technologies Office (BETO) 2015 "BALES" project review (https://energy.gov/sites/prod/files/2015/04/f21/terrestrial_feedstocks_corner_123_106.pdf) additional information related to general and specific aspects of forage baling are discussed, hereunder use of NIR scanning of material.

Tagging bales using radio frequency identification (RFID) technology to keep track of the material harvested is well known as such, cf. e.g. http://harvesttec.com/agco-bale-id/ from 2017. Here, the data is stored locally, on the tag itself. The information typically stored, along with the ID number, is weight, date and time, field name, average moisture, high moisture and amount of hay preservative. Typically, the reading of the RFID tag requires a special tool, e.g. an RFID reader.

While tagging of the bales is required to allow for keeping track of the product content with regard to type of material, quantity and quality, the tagging itself is a challenge with respect to efficiency, in particular because the tagging needs to take place at the site of the packing (wrapping) of the bales, which is typically outdoors, in wind, sometimes in rain, and with particles of sand, dust and other contaminants present.

Ideally, the tagging should be conducted in a fully automated process, in order to save time and labour costs, as well as to reduce the risk of human error.

Further, the tagging device itself should work independently of the wrapping device to reduce the risk of production downtime, it should be easy to replace and install, ensuring interchangeability and enabling retrofitting to existing machinery.

SUMMARY

The disclosed embodiments provide a simple, automatic and labour-effective method and device for tagging round-bales during packaging, without requiring the integration with a wrapper.

Also provided herein is a simple and effective method and device for tagging round bales during packaging in a manner supporting efficient information storage, handling and retrieval of the contents of the round bales.

As evident from the detailed description below, the inventive embodiments fulfill the criteria mentioned above. The tagging process is conducted in a safe and fully automatic manner, ensuring a clean and efficient handling of the tags, an exact positioning of each tag in the center of one of the end surfaces of each round bale, making it easy to locate and read the identity of the tag at a later point in time either electronically or manually. Finally, after the tag has been applied to the bale, it is covered and protected from wear and tear, moisture and possible chemical influence with one or more layers of plastic.

Positioning the tag at the center of the bale's circular surface is of significance because it simplifies subsequent reading of the ID tag. The ID tag itself is based on RFID technology, enabling automatic foolproof reading thereof with suitable equipment. However, because the embodiments further use of NFC communication, such reading may be done simply by using any ordinary smartphone with NFC support, without the need for an expensive special tool such as an RFID reader. NFC limits reading to a few centimeters distance, which in turn eliminates the problem of misreading adjacent tags that you did not intend to read. Similarly, being able to correctly position the tag is advantageous for traditional optical reading by QR-code or text, as knowing where to find the tag obviously simplifies the process of finding and reading it. The disclosed embodiments enable tags to be read by using not only RFID, but also by visual inspection of the UID printed on the tag exterior, but it could also be integrated with a printer for printing raw data on the label.

While the disclosed embodiments have been developed for round bales, it is equally applicable to all bales having flat, regular side surfaces, i.e. side surfaces having a well-defined center point.

The wrapper could be anything from a commercially available independent wrapper, such as Tanco 1400 Varwrap, part of a stationary baler-wrapper combination, such as Orkel MP2000 Compactor, or part of a mobile baler-wrapper combination such as New Holland Roll Baler 125 Combi. Because the embodiments are not an integrated part of the wrapper, but rather a standalone product, means that it is interchangeable and might be replaced or retrofitted to existing baling or wrapping machines, meaning it is well suited for being adapted to presently available wrappers.

Typical wrapping speed is one turn of the wrapper arms per second. In order for the tagging to take place, the speed of the wrapper arms may conveniently be slowed somewhat during the tagging operation or even temporarily stopped.

BRIEF DESCRIPTION OF THE DRAWINGS

Below, the present invention is described in further detail in the form of a non-limiting embodiment, with reference to accompanying drawings.

DETAILED DESCRIPTION

Figure 1:
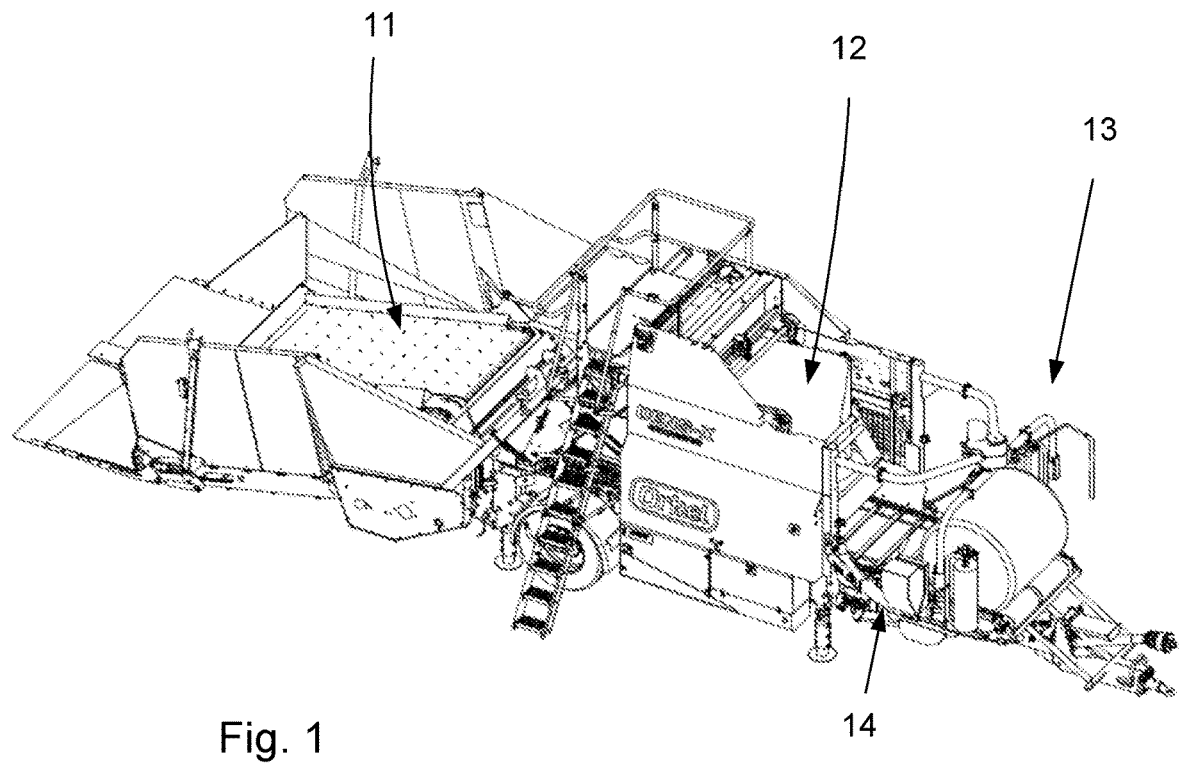
FIG. 1 is a perspectival view, which shows an assembly comprising a stationary baler-wrapper on which the disclosed embodiments are applicable.

FIG. 1 shows a stationary plant for receiving, baling and wrapping organic material, typically agricultural produce harvested for use as forage. A receiving section 11 is shown to the left, i.e. the area where freshly harvested material or the like is dumped from a front end loader or other harvesting machine. For typically stationary operations, such as for example TMR-producing factories, a conveyor belt may also be provided in this section. A baling section 12 arranged to compact the material and remove as much as possible of air present is shown in the middle of FIG. 1, with a wrapper 13 shown to the right, i.e. where the compacted bale is wrapped in several layers of plastic foil. A tagging assembly 14 according to the disclosure is indicated in connection with, but independent of, the wrapper.

Figure 2:
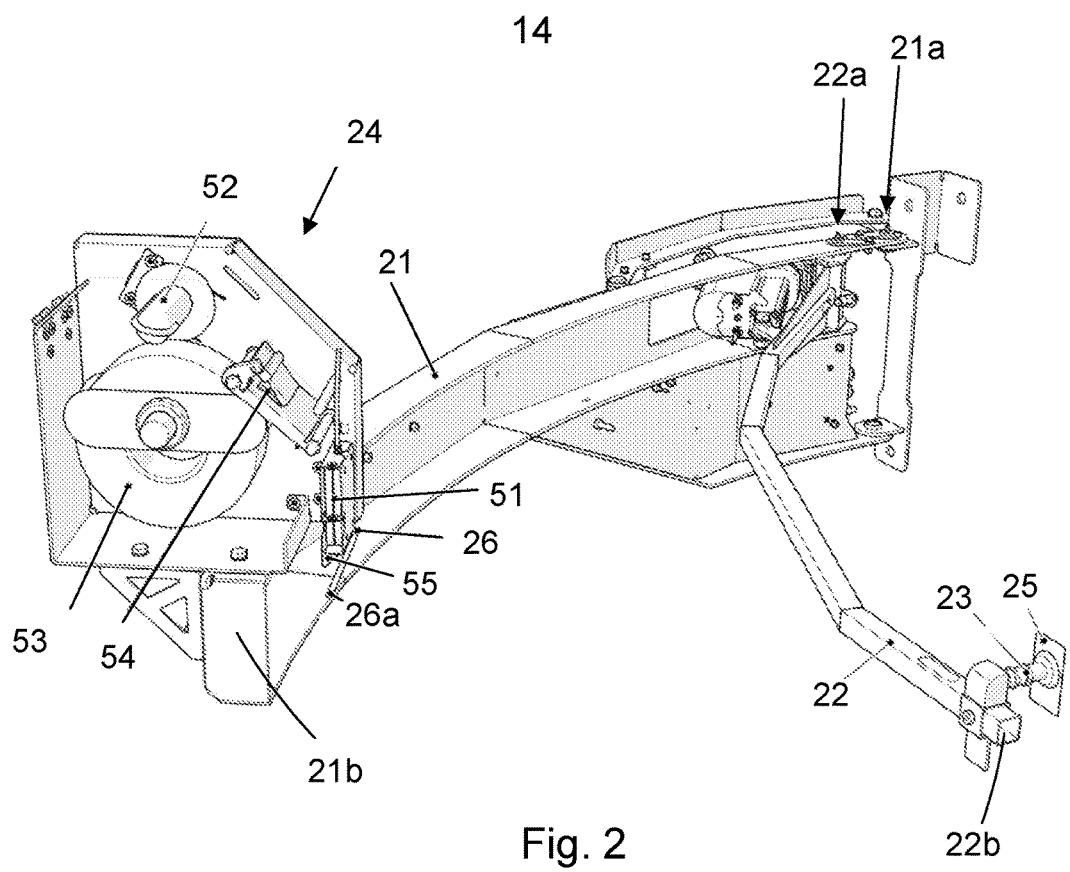
FIG. 2 is a side view of a tagging assembly according to the disclosure.

FIG. 2 shows in more detail the tagging assembly 14. The tagging assembly comprises a main arm 21 being hinged at one end 21a and having a free end 21b. A tagging arm 22 is hinged within the main arm 21 at 22a, having a free end 22b near the free end of the main arm 21b when the tagging arm is in a stand-by position. The main arm 21 is carrying a dispenser 24 for an ID tag magazine 53, which is a magazine for ID-tags comprising mechanical means to discharge/feed and program the ID-tags one at a time, in a step-wise and controlled manner. The tag discharge is further controlled and adjusted by the use of feeder sensor 54, which compensates for the expanding drag unit 52 diameter. The outlet from which the ID tags are discharged is positioned closely above the free end 22b of the tagging arm 22 when the tagging arm is in its stand-by position, more precisely above an ID tag transferring member 23 (best shown in FIGS. 3 and 4) held by the tagging arm 22. The tags are fed off a peeler plate 55 and pushed on to a suction cup, where vacuum is subsequently activated. During the entire tagging operation, the main arm 21 with the dispenser 24 remains stationary in a position outside the reach of wrapping arms. The hinge 21a has the sole purpose of allowing the main arm to be turned to another position for transportation of other purposes in which the baler is inoperative.

Figure 3:
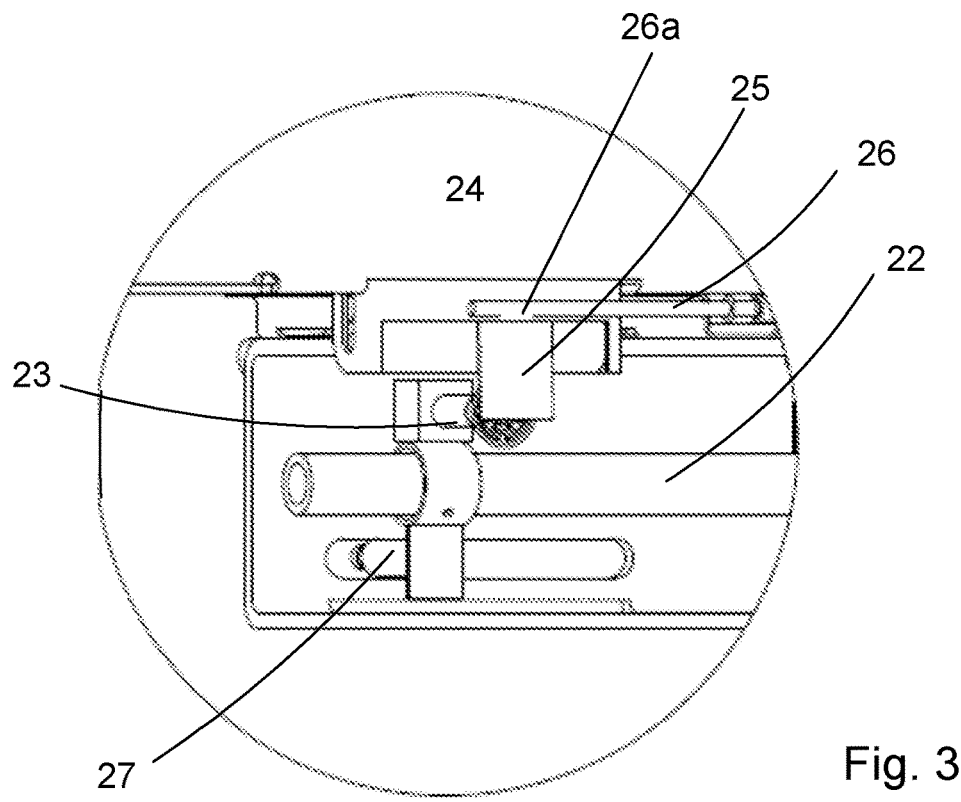
FIG. 3 is an enlarged detail view of elements from FIG. 2.

FIG. 3 shows that the ID tag transforming member 23 comprises—or is comprised by—a partially hollow tag supporting body, which is fluidly connected to an air pump (not shown), arranged to provide a slight overpressure or a slight negative pressure within the tag supporting body, depending upon the phase of operation. In order to reduce the risk of bending or disrupting the tag-antenna, the disclosed method and device make use of a tag supporting body with a flat surface, against which the ID tag may come to rest and be held in place by means of a slight negative pressure, until the ID tag is applied to the bale. The fluid connection from the tag supporting body to the air pump may go through a bore within the tagging arm or through a hose attached to the tagging arm. The embodiments are designed so as to not require that the air pump has to be affixed to the main arm, which is an advantage in terms of reducing weight, imbalance and complexity. However, the disclosed embodiments are also not limited to such an arrangement, and it is possible for example to attach an air compressor directly to the arm.

FIG. 3 further shows an ID tag 25 being discharged from the ID tag dispenser 24 positioned at the side thereof facing the bale (not shown in FIG. 3) by an ID-tag transferring member 23. A pipe 26 for pressurized air is arranged on the main arm 21, the pipe having a nozzle 26a positioned directly above the discharge outlet for the ID tags. The ID tags will not always be positioned immediately in front of the transferring member/tag supporting body, and in order to ensure that the negative pressure therein is able to grip and hold the ID tag, pressurized air is ejected for a moment, e.g. a second or two through nozzle 26a when a new ID tag is discharged, thereby forcing the ID-tag to come into contact with the transferring member/tag supporting body. While the transferring member and the tag supporting body in some embodiments may practically may be seen as one and the same, the tag supporting body is the only part of the transferring member which comes into actual physical contact with the ID tag.

In other embodiments than the one illustrated, the tag transferring member may be provided with mechanical means to hold and release the ID tag, and no tag supporting body.

The main arm 21 may be provided with a tagging arm sensor 27 arranged to detect whether or not the tagging arm 22 is in its stand-by position. This is preferable because if the tagging arm is not in its stand-by position even though it is supposed to, the system needs to interrupt its action and issue an alarm, since any tag discharged at that time will not be received by the transferring member and will not be transferred to the bale. Transporting only the tag and the tag transporting member, as opposed to transporting the entire assembly, represents greatly improved safety and efficiency in the tagging process, for example reducing risk of tearing the plastic foil. Notably, even with an increased transport speed, safety is preserved due to a surge gage, which detects obstructions.

Figure 4:
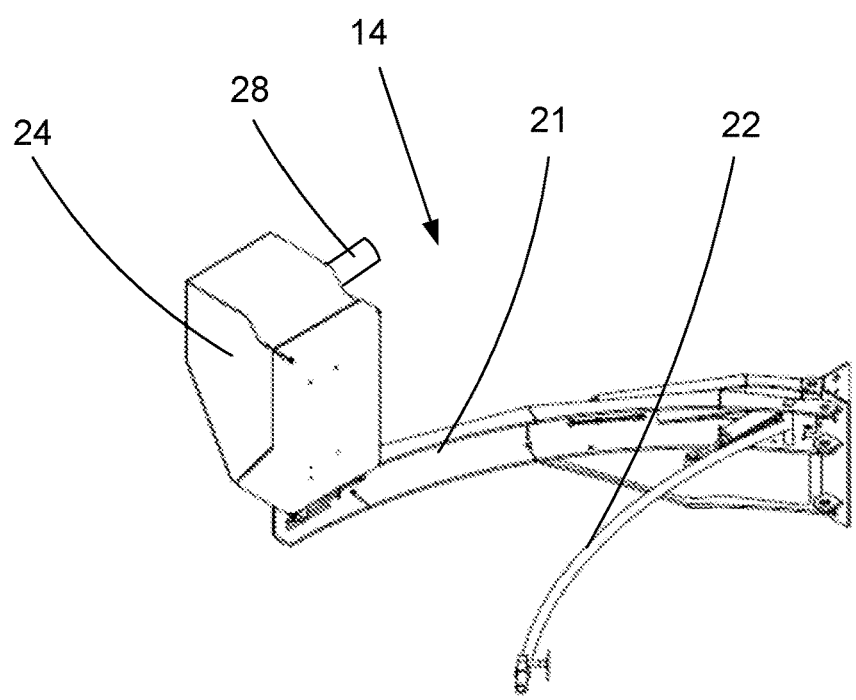
FIG. 4 is a perspectival view of the tagging assembly shown in FIG. 2 during operation.

FIG. 4 shows the tagging assembly in a situation where the tag transferring member has received an ID tag, in the process of transferring the ID tag to the bale (not shown). During operation, the main arm 21 will typically be fixed in a defined position, while the tagging arm shifts between the stand-by position, protected by the main arm along its length, and a tagging position as indicated by FIG. 4. Important functions of the main arm 21 are to hold the tag dispenser 24, to support and protect the tagging arm 22, and to hold pressure air pipes, electronics, etc. arranged in such a way as to ensure that the tags being discharged from the magazine is properly received by the tag transferring member 23, and additionally functions as a natural guard rail. Because the device is a separate and independent module, the problem of adding weight to the wrapper arms, as would be the case if the device were to be mounted on the rotary equipment itself, is resolved.

Figure 5:
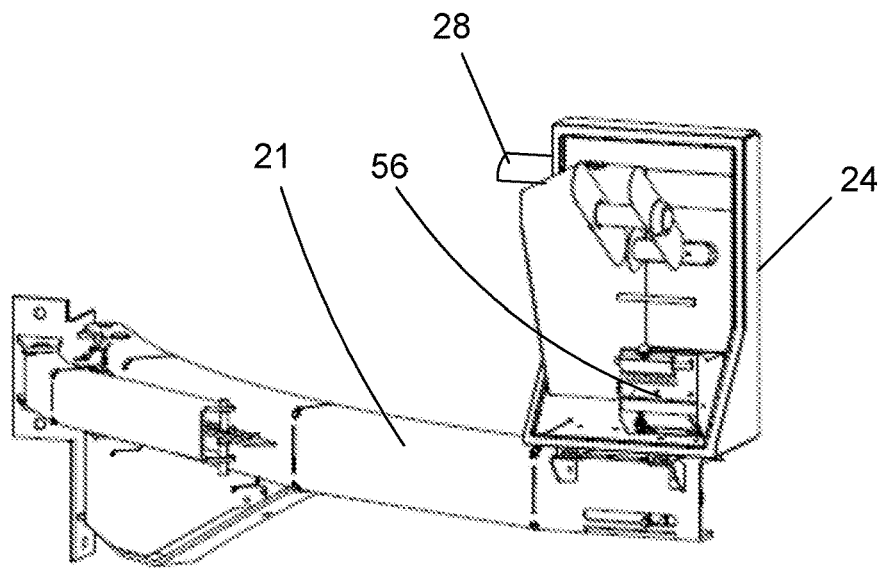
FIG. 5 is a perspectival view of the tagging assembly seen from another angle.

It should be noted that the main arm may be shifted between various relevant positions other than the operating position shown in FIG. 5, which includes but not by way of limitation; a transport position, in which the arm is pushed inwards towards the baling section 13, and a replacement position, which enables simple replacement of plastic foil rolls and other service operations (not shown) removed from the baling section 13. Furthermore, the main arm may be locked in place by a click-stop mechanism or similar.

FIG. 5 shows the tagging assembly from the opposite direction compared to FIG. 4, with the dispenser cover removed. A combined tag reader 56 and peeler plate 51 is located in the lowermost part of the dispenser 24. The tag reader reads the ID of the tag about to be applied to a bale, assigning to the tag ID all relevant information about the bale, such as type of material, weight, quality, owner, date, etc. This information may be stored locally or centrally, but the information handling as such is not part of the inventive aspects and is therefore not described in further detail. As described above, the feeding of the tags are controlled by a feeder sensor 54, which allows the ID tag magazine 53 to compensate for the expanding diameter of the take up roller on the drag unit 52, ensuring the correct degree of rotation of the electrical motor 28 and precise feeding of the tag.

Figure 6:
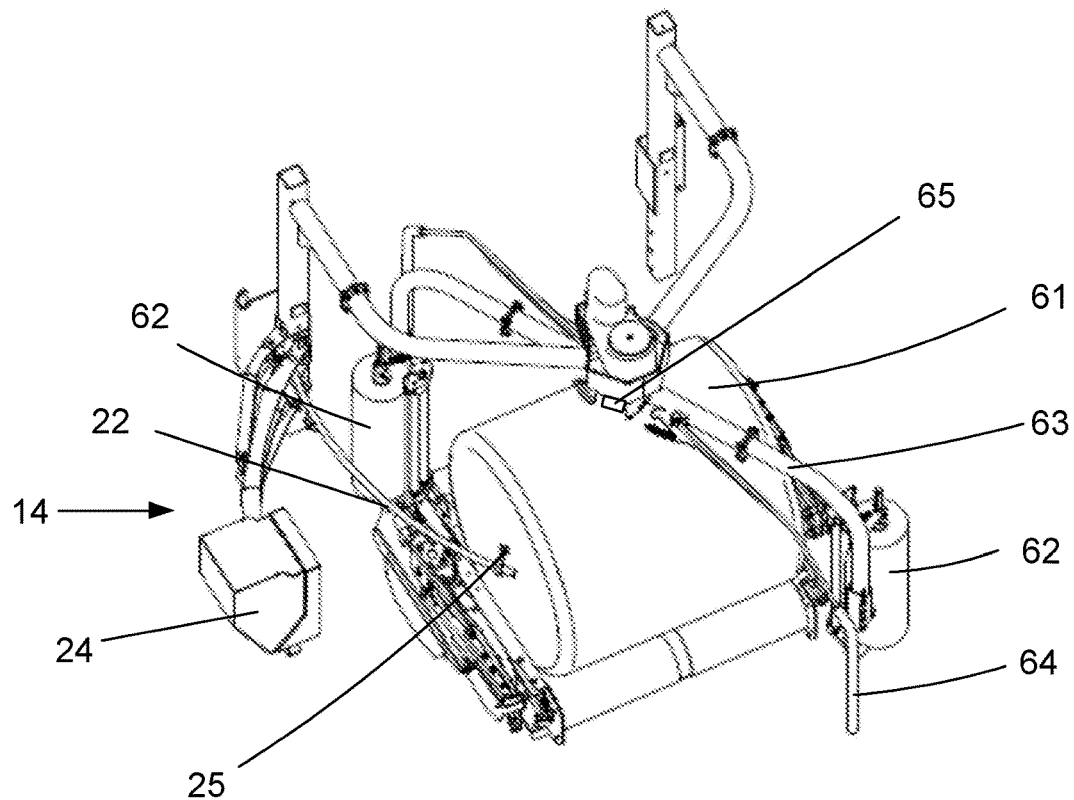
FIG. 6 is a perspectival view of the baling station including 5 the tagging assembly and further elements.

FIG. 6 shows a baling station with a bale 61, such as a forage bale, plastic foil on rolls 62, held by rotatable foil wrapping arms 63, as well as the tagging assembly 14. In the shown operational position, the main arm 21 is positioned in a distance sufficiently far away from the bale, allowing the foil wrapping arms 63 to rotate unobstructed. In FIG. 6, the free end of the tagging arm 22 has been moved away from the main arm 21, in order to apply an ID-tag to the center of the circular surface of the round bale. The movement of the foil wrapping arms 63 is synchronized with the movement of the tagging arm 22, using a sensor 65 located near the rotational center of the wrapping arms 63. This sensor is used to keep track of the position of the wrapping arms 63, not to activate the tagging process. Finally, at the position shown, the speed of the rotatable wrapping arms may as an optional feature be temporarily reduced or stopped.

After the tag has been applied, the foil wrapping arms 63 makes at least one or preferably two additional turns around the bale 61 to finalize the wrapping and thereby protect the ID tag 25 with at least one or preferably two layers of plastic foil, while still allowing for optical inspection of the tag.

An emergency stop arm 64 is also shown in FIG. 6.

While the operation of the tagging arm may be performed in different ways using different power sources, it is preferred that it is operated electrically and pneumatically using a source of pressurized air, typically with a pressure of less than 10 bar, e.g. in the range 4 to 7 bar.

The present invention enables the system to perform the greater part of the tagging process, e.g. the reading, feeding and grabbing of the tag, while the wrapper arms are still rotating at full speed. Only the final motion of transporting the tag to the bale requires that the wrapper be stopped, speeding up the tagging process and making it very efficient compared to existing solutions.

The invention claimed is:

1. A method for tagging round bales (61) during wrapping in plastic foil, the round bales having a generally cylindrical shape with generally circular end surfaces, comprising the steps of:
   (a) using a wrapper selected from the group consisting of an independent bale wrapper, a stationary baler-wrapper combination, a compactor and a mobile baler-wrapper combination,
   (b) positioning each round bale with the end surfaces substantially vertically oriented,
   (c) wrapping layers of plastic foil around the round bale by moveable foil wrapping arms (63),
   (d) at an intermediate point in time during the step of wrapping, attaching an identification (ID) tag (25) with an adhesive back-side surface to one of the generally circular surfaces of a round bail using a time controlled pivotal tagging arm (22) having a first end (22a) hinged to a main arm (21) that carries an ID tag magazine (24) with ID tags (25) and a free end (22b) with a tag transferring member (23), the tagging arm (22) being arranged to transfer one ID tag (25) at a time from the ID tag magazine (24); and
   (e) wrapping at least one additional layer of plastic foil around each round bale and the attached ID tag (25), wherein
   movement of said tagging arm (22) in step (d) is controlled by a computer unit that synchronizes said movement of the tagging arm with the movement of the foil wrapping arms (63).

2. The method of claim 1, wherein the pivotal tagging arm (22) is electrically operated.

3. The method of claim 1, wherein the tag transferring member (23) comprises a tag supporting body that is at least partially hollow, wherein the tag supporting body is fluidly connected to an automatically operated air pump.

4. The method of claim 3, wherein the air pump is operated to create a negative pressure at the hollow tag supporting body when an ID tag (25) is transferred to the round bale.

5. The method of claim 3, wherein the air pump is operated to create an overpressure at the hollow tag supporting body when no ID tag is present at the hollow tag supporting body, thereby maintaining the hollow tag supporting body free from contaminants.

6. The method of claim 1, wherein using an ID tag (25) comprising an RFID antenna for electronic reading of its identification.

7. The method of claim 1, wherein the free end (22b) of the tagging arm (22) during operation is accelerated from a standby position wherein the tag transferring member (23) is positioned at a distance from the round bale (61) towards an approximate center of a circular end face of the round bale (61), and then decelerated and given a distinct push against the round bale (61) to improve adhesive contact of the ID tag to the plastic layer covering the round bale.

8. The method of claim 7, wherein the air pump shifts direction from pumping air away from the tag transferring member (23) to pumping air towards the tag transferring member (23) when the ID-tag (25) has obtained adhesive contact with the plastic layer covering the round bale.

9. The method of claim 1, wherein movement of the foil wrapping arms (63) is decelerated when the tagging arm is operated.

10. A device for tagging round bales (61) during wrapping in plastic foil, the round bales having a generally cylindrical shape with generally circular end surface, the device being adapted for connection to a wrapper having movable foil wrapping arms (63) and selected from the group consisting of a mobile bale wrapper, a stationary bale wrapper, a stationary baler-wrapper combination, a compactor and a mobile baler-wrapper combination, the wrapper being arranged to position each round bale (61) with its generally circular end surfaces substantially vertically oriented, and to wrap layers of plastic foil around the round bale (61) by the moveable foil wrapping arms (63), comprising:

a tagging arm (22) hinged at a first end (22a) to a main arm (21) that carries an ID tag magazine (24) with ID tags (25) and being free at an opposite second end (22b), a tag transferring member (23) arranged at the tagging arm free end (22b) configured to receive ID tags (25) one at a time from the ID tag magazine (24) and to hold and release the ID tags (25), said tagging arm (22) being arranged to allow pivotal movement between a first standby position where its free end (22b) is positioned spaced from the round bail, thereby allowing the foil wrapping arms (63) to move between the free end and the bail, and a second tagging position wherein the tag transferring member (23) contacts one of the cylindrical end surfaces, and a control unit arranged to synchronize movement of the foil wrapping arms with movement of the tagging arm.

11. The device of claim 10, wherein the tag transferring member (23) comprises a hollow tag supporting member (23) fluidly connected to an air pump arranged to pump air alternatingly to and from the hollow tag supporting member (23).

12. The device of claim 11, further comprising a tag reader (56) in connection with the tag dispenser (24) arranged to read identifying information of an ID tag (25) prior to said ID tag being attached to a round bale (61), said tag reader arranged to communicate with a processing unit arranged to collect qualitative and quantitative information of the round bales, thereby allowing the identity of each round bale (61) to be connected to said qualitative and quantitative information.

13. The device of claim 11, further comprising a nozzle (26a) fluidly connected to a source (26) of pressurized air, said nozzle being positioned where the ID tags (25) are moved from the tag dispenser (24) to the tag transferring member (23), allowing a pulse of pressurized air on the ID tag to improve contact between the ID tag (25) and the tag transferring member (23) before the tagging arm (22) is moved from its standby position to attach the ID tag to the bale (61).

14. The device of claim 11, further comprising a feeder sensor (54) arranged to ensure that feeding of the ID tags from the ID tag magazine (53) is compensated with regard to an expanding diameter of a take up roller on a drag unit (52).

15. The device of claim 10, further comprising a tag dispenser (24) with a mechanical step-wise tag feeder to provide tags to the tag transferring member one at the time, said tag dispenser (24) being attached to a main arm (21).

16. The device of claim 10, further comprising a tag reader (56) in connection with the tag dispenser (24) arranged to read identifying information of an ID tag (25) prior to said ID tag being attached to a round bale (61), said tag reader arranged to communicate with a processing unit arranged to collect qualitative and quantitative information of the round bales, thereby allowing the identity of each round bale (61) to be connected to said qualitative and quantitative information.

17. The device of claim 16, wherein the processing unit arranged to collect qualitative and quantitative information and the control unit synchronizing the movement of the tagging arm (22) with the foil wrapping arms (63) use the same processing system.

18. The device of claim 10, further comprising a nozzle (26a) fluidly connected to a source (26) of pressurized air, said nozzle being positioned where the ID tags (25) are moved from the tag dispenser (24) to the tag transferring member (23), allowing a pulse of pressurized air on the ID tag to improve contact between the ID tag (25) and the tag transferring member (23) before the tagging arm (22) is moved from its standby position to attach the ID tag to the bale (61).

19. The device of claim 10, further comprising a sensor (65) that keeps track of the position of the wrapping arms (63).

20. The device of claim 10, further comprising a feeder sensor (54) arranged to ensure that feeding of the ID tags from the ID tag magazine (53) is compensated with regard to an expanding diameter of a take up roller on a drag unit (52).

* * * * *

UNITED STATES PATENT AND TRADEMARK OFFICE
CERTIFICATE OF CORRECTION

PATENT NO.         : 11,510,370 B2
APPLICATION NO.    : 16/762226
DATED              : November 29, 2022
INVENTOR(S)        : Magnus Nordaas Lervik and Halvor Skraastad It is certified that error appears in the above-identified patent and that said Letters Patent is hereby corrected as shown below:

In the Claims

Column 6, Claim 1, Line 36:
Insert --end-- after "circular"

Column 6, Claim 1, Line 36:
Delete "bail" and insert --bale--

Column 7, Claim 10, Line 19:
Delete "surface" and insert --surfaces--

Column 7, Claim 10, Line 38:
Delete "bail" and insert --bale--

Column 7, Claim 10, Line 40:
Delete "bail" and insert --round bale--

Signed and Sealed this
Thirty-first Day of January, 2023

Katherine Kelly Vidal
*Director of the United States Patent and Trademark Office*